A. M. DEMUTH.
MEAT SHAPER AND PRESS.
APPLICATION FILED MAY 24, 1920.
1,432,161. Patented Oct. 17, 1922.
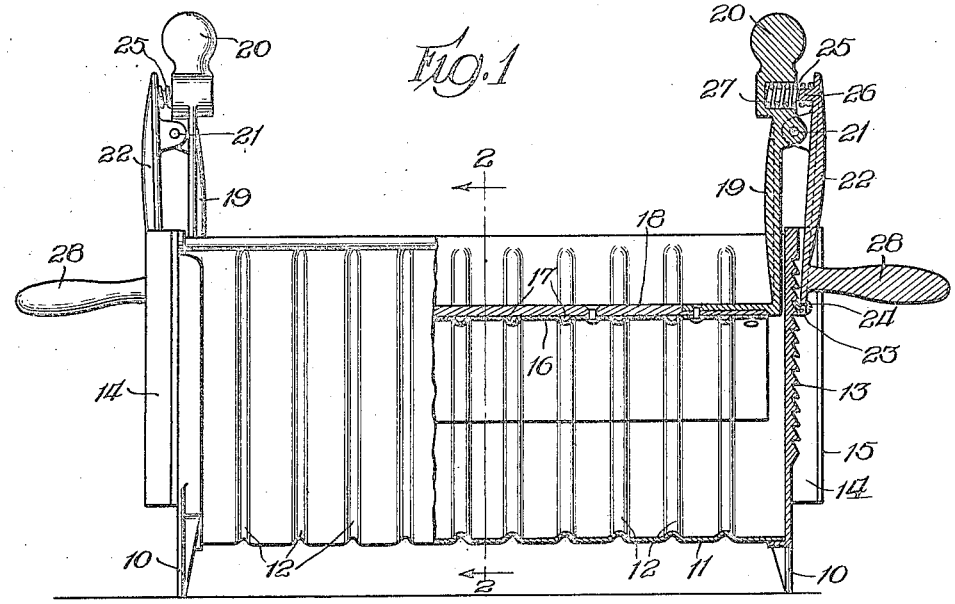
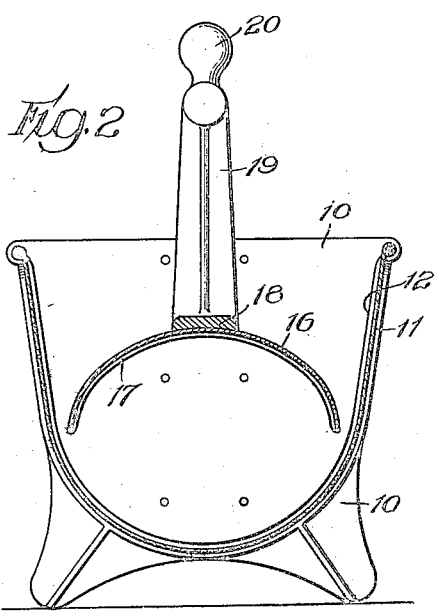 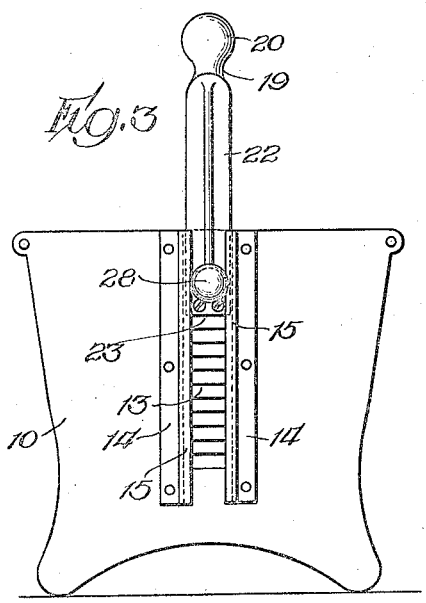
Inventor
Alfred M. Demuth Patented Oct. 17, 1922.

1,432,161

UNITED STATES PATENT OFFICE.

ALFRED M. DEMUTH, OF CHICAGO, ILLINOIS.

MEAT SHAPER AND PRESS.

Application filed May 24, 1920. Serial No. 383,698.

*To all whom it may concern:*

Be it known that I, ALFRED M. DEMUTH, a citizen of the United States, residing at Chicago, in the county of Cook and State of Illinois, have invented certain new and useful Improvements in Meat Shapers and Presses, of which the following is a specification.

This invention relates to improvements in meat shaper and press particularly adapted though not necessarily limited in its use for pressing and shaping hams from which the bone has been removed, and one of the objects of the invention is to provide an improved press of this character embodying a receptacle for receiving the meat to be shaped and having a follower co-operating with the receptacle and adapted to be forced thereinto and co-operating with the receptacle wall for shaping the meat.

A further object is to provide improved means exterior of the receptacle for maintaining the follower in its adjusted position, and improved means whereby the follower may be, by a single movement of the operator, forced into contact with the meat and automatically locked in its adjusted position.

To the attainment of these ends and the accomplishment of other new and useful objects as will appear, the invention consists in the features of novelty in substantially the construction, combination and arrangement of the several parts hereinafter more fully described and claimed and shown in the accompanying drawing illustrating this invention and in which—

Figure 1 is a view partly in side elevation and partly in vertical section.

Figure 2 is a sectional view taken on line 2—2 Figure 1.

Figure 3 is an end elevation.

Referring more particularly to the drawing the receptacle for containing the meat preferably embodies end members 10 of any desired size and configuration and connected with these end members in any suitable manner and therebetween is a body portion 11 which co-operates with the end members to form a receptacle for the meat to be shaped or pressed. This receptacle is preferably constructed of some thin sheet material and is provided with a plurality of laterally spaced inwardly projecting ribs 12.

Carried by the outer faces of the end members 10 are racks 13, one on each of the members and arranged on opposite sides of the racks 13 are guides 14 the edges 15 of which project toward but terminate short of each other and are spaced beyond the rack teeth for a purpose to be hereinafter set forth.

A follower 16 constructed of any suitable material and of any desired configuration, preferably of a downwardly curved shape and being of any suitable sheet material is provided to move toward and away from the bottom of the receptacle. This follower is also preferably shaped with downwardly projecting ribs 17 to co-operate with the ribs 12 and thereby form grooves around the body of the meat which serve to hold the meat together in lieu of the ordinary binding strings.

This follower is supported preferably by means of a bar or member 18 to which it is secured and arranged at the ends of this member 18 are uprights 19 which project for a considerable distance thereabove, the upper extremities of the bars 20 preferably terminate in handles or knobs.

Pivotally connected with each of the uprights 19 and intermediate its ends as at 21 is an element 22, the pivot being preferably located some distance above the member 18 so that the free end 23 of the element 22 terminates adjacent the member 18 and this free end is adapted to pass over the rack 13 and within the guides 14. A tooth 24 is connected with the free end 23 of the element 22 and co-operates with the rack teeth 23, a spring or elastic member 25 being provided, preferably on the opposite side of the pivot 21 and which spring 25 tends normally to move the element 22 in a direction about its pivot so that the tooth 24 will engage the rack teeth 13. This spring 25 preferably engages over a lug 26 on the element 22 at one end and the other end of the spring is seated within a recess 27 in the upright 19.

In order to control the element 22 so as to cause the tooth 24 to disengage the racks 13, a suitable handle 28 may be connected with each of the elements 22 preferably adjacent the tooth end thereof.

In use the article to be shaped is placed within the receptacle and the follower is then placed in position by the operator by grasping the handles 28 and moving the elements 22 about their pivots 21 so as to move the tooth 24 away from the uprights 19. The follower may then be placed in position within the receptacle and in so doing the ends 10 of the receptacle will pass between the respective uprights 19 and the elements 22. When the follower has been placed in the receptacle to such an extent that the teeth 24 when released will engage in the rack teeth 13, and the operator releases the handles 28, the follower will be supported in position either by contact with the article in the receptacle or by friction caused between the teeth 24 and the rack teeth 13. In this position and when it is desired to force the follower against the article, this may be accomplished in either one of two ways. The operator may force the follower downwardly by exerting pressure upon the handles 28 at which time the teeth 24 will move over the rack teeth, or the follower may be forced downwardly with a single movement by exerting a sudden pressure upon the hand engaging portions 20 at the upper ends of the portions 19.

To remove the follower the operator grasps the handles 28 and moves them outwardly so as to disengage the teeth 24 from the rack teeth at which time, and when the teeth 24 are held in this position, the follower may be readily lifted from the receptacle.

By the provision of the overhanging edges 15 of the guides 14, the movement of the elements 22 about their pivots in one direction will be limited.

Obviously the upper ends of the guides 14 are left open so that the follower may be readily removed from the receptacle.

While the preferred form of the invention has herein been shown and described it is to be understood that various changes may be made in the details of construction and in the combination and arrangement of the several parts within the scope of the claims and without departing from the spirit of this invention and if desired, the uprights 19 may be formed integral with the member 18 instead of being formed separately and connected therewith as is shown in Figure 1 of the drawing.

What is claimed as new is:

1. A meat shaper and press embodying a receptacle for the meat, a follower movable in the receptacle and co-operating with the walls of the receptacle to press the meat, a pawl and ratchet mechanism connected with the follower and the wall of the receptacle for locking the follower in its adjusted position, said mechanism being disposed entirely exterior of the receptacle, and means connected with the receptacle for limiting the movement of the pawl in one direction, and with respect to which means the pawl is adapted for free vertical movement with the said follower.

2. A meat shaper and press embodying a receptacle for the meat, a follower movable in the receptacle and co-operating with the walls of the receptacle to press the meat, uprights connected with the follower, pawl and ratchet mechanism for locking the follower in its adjusted position, said mechanism being disposed entirely exterior of the receptacle, said pawls being connected with the uprights, the upper end of each of the uprights projecting above the pawls and being shaped to form handles whereby the follower may be forced into the receptacle to cause the pawls to freely slide over the rack.

3. A meat press and shaper embodying a receptacle for the meat, a follower for compressing the meat, uprights connected with the follower adjacent opposite walls of the receptacle, a pivotally mounted element connected with each of the uprights outside of the receptacle, racks connected with the outer faces of the receptacle, a tooth carried by said elements and adapted to co-operate with the respective racks, yielding means tending normally to move the elements about their pivots in directions to cause the teeth to engage the racks, the upper ends of said uprights projecting beyond the pawls and being shaped into hand engaging portions by means of which the follower may be forced by a single movement into engagement with the meat, and handles individual to the said elements and connected therewith adjacent the toothed ends thereof for moving the elements about their pivots and against the stress of the said yielding means.

4. A meat press and shaper embodying a receptacle for the meat, rack teeth exterior thereof and arranged opposite each other, a follower, uprights projecting above the follower adjacent the said racks, a pawl element pivotally connected with each of the uprights exterior of the receptacle and arranged to extend along the outside thereof, said elements each having a tooth at the free end thereof to co-operate with the rack, means tending normally to move the element in a direction to cause the teeth to engage the rack, and a handle connected with each of said elements adjacent the toothed end thereof, the said means tending normally to move the toothed end of the said elements towards the respective supports so that when the pawls disengage the racks the ends of the said elements will be in positions to engage and rest upon the top of the walls of the receptacle to support the follower as a closure for the receptacle.

5. A meat press and shaper embodying a receptacle for the meat, rack teeth exterior thereof and arranged opposite each other, a follower, uprights projecting above the follower adjacent the said racks, a pawl element pivotally connected with each of the uprights exterior of the receptacle and arranged to extend along the outside thereof, said elements each having a tooth at the free end thereof to co-operate with the rack, means tending normally to move the element in a direction to cause the teeth to engage the rack, a handle connected with each of said elements adjacent the toothed end thereof, and guides for the free ends of the said elements, said guides extending along the racks and serving to limit the pivotal movement of the respective elements in one direction.

In testimony whereof I have signed my name to this specification, on this 21st day of May, A. D. 1920.

ALFRED M. DEMUTH.